United States Patent [19]
Fukushima et al.

[11] Patent Number: 5,406,330
[45] Date of Patent: Apr. 11, 1995

[54] VIDEO CAMERA HAVING IMAGE SENSORS DRIVEN BY DIFFERENT VERTICAL DRIVE SIGNALS

[75] Inventors: Yasushi Fukushima, Nishinomiya; Kohji Mitani, Sagamihara; Masayuki Sugawara, Komae; Yoshihiro Fujita, Tama; Tomoyuki Tsurube, Tokyo; Hideo Cho, Yokohama, all of Japan

[73] Assignees: Matsushita Electric Industrial Co., Ltd., Osaka; Nippon Hoso Kyokai, Tokyo; Matsushita Communication Ind. Co., Ltd., Yokohama, all of Japan

[21] Appl. No.: 93,647

[22] Filed: Jul. 20, 1993

[30] Foreign Application Priority Data

Jul. 24, 1992 [JP] Japan ............................ 4-198100

[51] Int. Cl.⁶ ............................................. H04N 3/15
[52] U.S. Cl. ................................... 348/265; 348/312
[58] Field of Search ............... 348/262, 264, 265, 629, 348/630, 914, 312, 317; H04N 9/09

[56] References Cited

U.S. PATENT DOCUMENTS 4,672,430  6/1987  Asaida ........................ 348/265 X

FOREIGN PATENT DOCUMENTS

0018659A2  11/1980  European Pat. Off. .
537942A    2/1993   Japan .
2048609    12/1980  United Kingdom .

OTHER PUBLICATIONS

Patent Abstracts of Japan, vol. 6, No. 211 (E-137)(1089), 23 Oct. 1982 & JP-A-57 115 089 (Hitachi Denshi K.K.) 17 Jul. 1982.
Patent Abstracts of Japan, vol. 6, No. 128(E-118)(1006) 14 Jul. 1982 & JP-A-57 055 682 (Hitashi Denshi K.K.) 2 Apr. 1982.

*Primary Examiner*—Michael T. Razavi
*Assistant Examiner*—Wendy R. Greening
*Attorney, Agent, or Firm*—Stevens, Davis, Miller & Mosher

[57] ABSTRACT

A video camera having a plurality of solid-state image sensors in an imaging part uses two kinds of vertical drive signals different in the number of vertical transfer operations, to produce a time lag equal to one horizontal period between the output signals of the solid-state image sensors without changing the optical positional relation between the solid-state image sensors, thereby delaying the red and blue signals with respect to the green signal by one horizontal period based on the application of the two kinds of vertical drive signals.

14 Claims, 5 Drawing Sheets

VIDEO CAMERA HAVING IMAGE SENSORS DRIVEN BY DIFFERENT VERTICAL DRIVE SIGNALS

BACKGROUND OF THE INVENTION

1. FIELD OF THE INVENTION

The present invention relates to a video camera using a solid-state image sensor, and more particularly to a video camera having an image enhancing circuit.

2. DESCRIPTION OF THE RELATED ART

An image pickup tube has hitherto been widely used as the imaging means of a video camera. The image pickup tube, however, has drawbacks such as an image lag, sticking, and cumbersome adjustment. It has been earnestly desired to overcome such drawbacks. With the advance of semiconductor technology, the performance of a solid-state image sensor such as a charge coupled device (CCD) has been rapidly improved. Thus, the solid-state image sensor has become the mainstream of an imaging device.

A video camera using a solid-state image sensor is usually made up of a driving part, an imaging part, a signal processing part, and an image enhancing part. In the imaging part, a solid-state image sensor converts a light signal indicative of an image into an electric signal, which is delivered from the solid-state image sensor. In a video camera required to form a high-quality image such as a broadcasting camera, the imaging part is made up of a color separation prism and three solid-state image sensors. For example, in the R-G-B method, red, green and blue components are separately taken out of the prism.

In order to take out a signal from each of the solid-state image sensors, the driving part produces a drive signal, and drives the solid-state image sensors. Since a solid-state image sensor used in a video camera is an area sensor, the solid-state image sensor is usually driven in two directions, that is, horizontal and vertical directions.

The signal processing part carries out various signal processing which includes signal amplification and γ-processing. The image enhancing part amplifies a high-frequency region of a video signal, and thus can be regarded as a portion of the signal processing part. Owing to the above operation, the contour portion of an image is made clear, and a distinct image is obtained. Image enhancement is usually carried out in horizontal and vertical directions. In order to carry out the image enhancement in the vertical direction, not only the signal from a target pixel but also the signals from pixels adjacent to the target pixel on the upper and lower sides are required. Further, a delay circuit for delaying a signal by one horizontal period is required.

In order to simplify the image enhancing circuit and to carry out the effective enhancement, the out-of-green method is used. According to this method, a contour signal is produced only from the video signal of a G-channel, and is then added to the video signal of each of R-, G- and B-channels to carry out image enhancement. The video signal of the G-channel used for forming the contour signal is delayed by one horizontal period. Accordingly, it is necessary to delay the video signals of the R- and B-channels by one horizontal period.

In other words, even when the out-of-green method is used, a conventional video camera is required to have two 1-horizontal-period delay circuits for the G-channel and to have one 1-horizontal-period delay circuit for each of the R- and B-channels. That is, the video camera is required to have four 1-horizontal-period delay circuits. In an analog system, a glass delay line is used as the 1-horizontal-period delay circuit. In a digital system, a semi-conductor memory is used as the 1-horizontal-period delay circuit. In either case, the video camera will become large in power consumption and circuit scale. That is, the fact that there are not a few 1-horizontal-period delay circuits in the image enhancing circuit, will be a serious obstacle to the production of a camera head with a built-in, image enhancing circuit.

The number of 1-horizontal-period delay circuits included in the image enhancing part can be reduced by shifting the relative optical position of the solid-state image sensors in the vertical direction. In this case, on the output side of the signal processing part, the R- and B-channels are always delayed as compared with the G-channel, by one horizontal period. That is, it is unnecessary to use a 1-horizontal-period delay circuit for each of the R- and B-channels. This method, however, is not applicable to image enhancing circuits other than the image enhancing circuit for exclusive use of the above video camera. For example, in a case where desired coefficient matrix processing is carried out in the R-, G- and B-channels, and the-signal thus obtained is used for image enhancement, it is required that there is not any time difference among the R-, G- and B-channels. Therefore, the method of shifting the relative optical position of solid-state image sensors is not applicable to an image enhancing circuit used in the above case.

SUMMARY OF THE INVENTION

It is an object of the present invention to provide a video camera which can change the time relation between the output signals of plural solid-state image sensors without changing the optical positional relation between the solid-state image sensors, which can reduce the number of 1-horizontal-period delay circuits included in an image enhancing part, and which is applicable to not only an image enhancing circuit for exclusive use of the video camera but also a general, external image enhancer.

In order to attain the above object, according to the present invention, there is provided a video camera, in which plural solid-state image sensors are driven by two kinds of vertical drive signals different in the number of vertical transfer pulses from each other. When one of the vertical drive signals is smaller in the number of vertical drive pulses than the other vertical drive signal, the output signal of a solid-state image sensor driven by the one vertical drive signal is delayed as compared with the output signal of a solid-state image sensor driven by the other vertical drive signal, by a period equal to a multiple of one horizontal period. This multiple is given by the difference in the number of vertical drive pulses between the vertical drive signals. Thus, even when the optical positional relation between the solid-state image sensors is kept unchanged, the time relation between the output signals of the solid-state image sensors can be changed.

Further, according to the above method of driving the solid-state image sensors, the number of 1-horizontal-period delay circuits included in an image enhancing circuit can be reduced. Thus, the power consumption and circuit scale of the image enhancing circuit can be reduced. Further, the time relation between the output signals of the solid-state image sensors can be readily controlled by changing at least one of the vertical drive signals. Therefore, a video camera according to the present invention is applicable to not only a built-in image enhancing circuit but also a general, external image enhancers.

DESCRIPTION OF THE PREFERRED EMBODIMENTS

Figure 1:
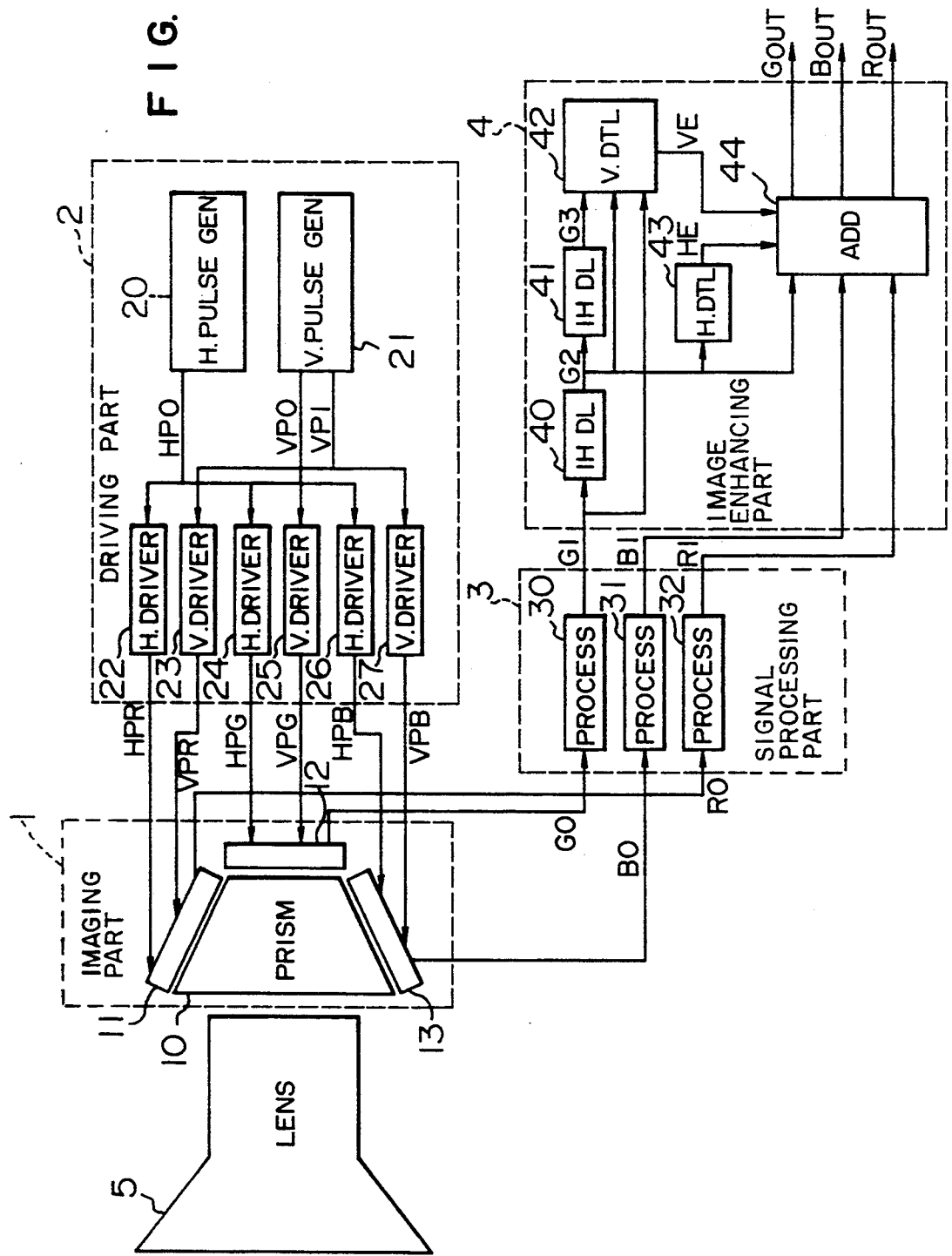
FIG. 1 is a block diagram showing the first embodiment of a video camera according to the present invention.

FIG. 1 is a block diagram showing the first embodiment of a video camera according to the present invention which embodiment is a video camera in the RGB imaging method. The present embodiment includes an imaging part 1, a driving part 2, a signal processing part 3, an image enhancing part 4, and a lens 5. The construction and operation of each part will be explained below.

The configuration and operation of the imaging part 1 will first be explained. The imaging part 1 is made up of a prism 10 and three solid-state image sensors 11, 12 and 13. Incident light having passed through the lens 5 is separated by the prism 10 into three components, that is, R-, G- and B-components (red, green and blue components), which form optical images on the solid-state image sensors 11, 12 and 13, respectively. When a transfer pulse is supplied from the driving part 2 to each of the solid-state image sensors 11 to 13, a video signal stored in each solid-state image sensor is delivered therefrom.

Roughly speaking, the driving part 2 is made up of a drive signal generating portion and a driver portion. The drive signal generating portion includes a horizontal drive signal generating circuit 20 and a vertical drive signal generating circuit 21. The driver portion includes three horizontal drivers 22, 24 and 26 and three vertical drivers 23, 25 and 27.

The horizontal drive signal generating circuit 20 delivers a horizontal drive signal HPO. The horizontal drivers 22, 24 and 26 amplify the horizontal drive signal HPO, and deliver horizontal drive pulse signals HPR, HPG and HPB, respectively. The vertical drive signal generating circuit 21 delivers vertical drive signals VP0 and VP1. The vertical driver 25 amplifies the vertical drive signal VP0, and delivers a vertical drive pulse signal VPG. The vertical drivers 23 and 27 amplify the vertical drive signal VP1, and deliver vertical drive pulse signals VPR and VPB, respectively.

In the imaging part 1, each solid-state image sensor is applied with horizontal and vertical drive pulse signals to deliver a device output signal. In more detail, the solid-state image sensor 11 for R-channel is applied with the horizontal drive pulse signal HPR and the vertical drive pulse signal VPR to deliver a device output signal RO for R-channel. Similarly, the solid-state image sensor 12 for the G-channel is applied with the horizontal drive pulse signal HPG and the vertical drive pulse signal VPG to deliver a device output signal GO for the G-channel. Further, the solid-state image sensor 13 for B-channel is applied with the horizontal drive pulse signal HPB and the vertical drive pulse signal VPB to deliver a device output signal BO for the B-channel.

Figure 2:
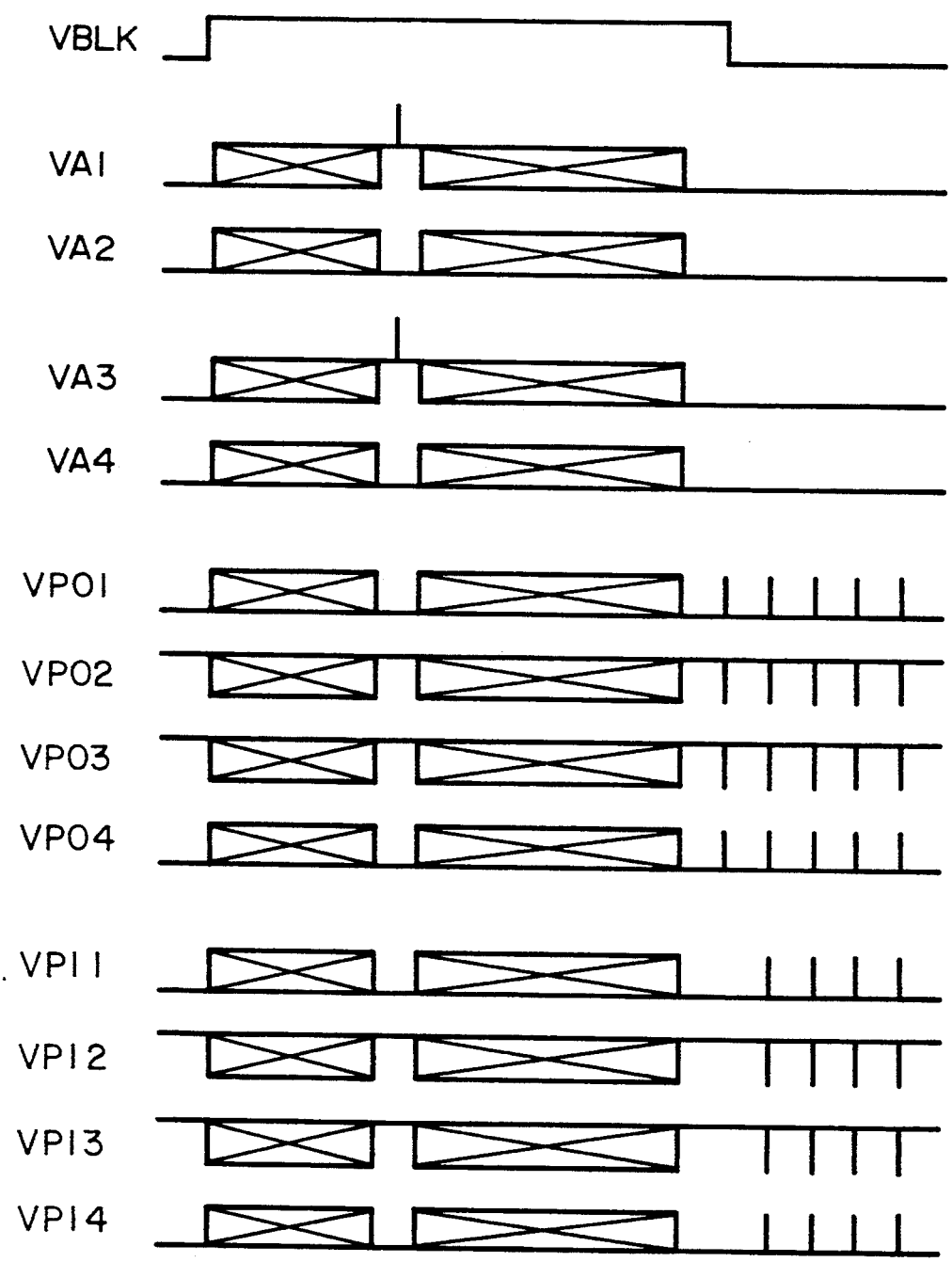
FIG. 2 is a timing chart showing vertical drive signals used in the first embodiment of FIG. 1.

Now, let us consider a case where each of the solid-state image sensors 11 to 13 is a CCD of the frame interline transfer (FIT) type. In this case, for example, the vertical drive signals VP0 and VP1 will have the waveforms shown in FIG. 2. Referring to FIG. 2, the waveform of a 4-phase drive signal applied to an image area is indicated by VA1, VA2, VA3 and VA4, and the waveform of another 4-phase signal applied to a storage area is indicated by (VP01, VP02, VP03 and VP04) or (VP11, VP12, VP13 and VP14). It is to be noted that the vertical drive signal VP0 is made up of eight kinds of signals VA1, VA2, VA3, VA4, VP01, VP02, VP03 and VP04, and the vertical drive signal VP1 is made up of eight kinds of signals VA1, VA2, VA3, VA4, VP11, VP12, VP13 and VP14.

It is necessary to perform three kinds of operations (that is, sweep-out transfer, charge shift from photodiode, and high-speed charge transfer) in a vertical blanking period. The signal waveforms of FIG. 2 express these operations. Further, the signal waveforms applied to the storage area include a pulse for performing an interline transfer operation in each horizontal blanking period. The signal VP11 is smaller in the number of interline pulses than the signal VP01 by one. Similarly, the signals VP12, VP13 and VP14 are smaller in the number of interline pulses than the signals VP02, VP03 and VP04, respectively. In this case, the driving operation due to the vertical drive signal VP1 is smaller in the number of vertical transfer operations than the driving operation due to the vertical drive pulse VP0 by one. Thus, the output of a solid-state image sensor driven by the vertical drive signal VP1 is delayed as compared with the output of a solid-state image sensor driven by the vertical drive signal VP0, by one horizontal period.

That is, in spite of the fact that the optical positions of the solid-state image sensors 11, 12 and 13 are equivalent to one another, the outputs RO and BO of the image sensors 11 and 13 are delayed as compared with the output GO of the image sensor 12, by one horizontal period.

Next, explanation will be made of the signal processing part 3, which is made up of three signal processing circuits 30, 31 and 32. The signal processing circuit 30 for the G-channel is applied with the device output signal GO, and carries out various signal processing for the signal GO to deliver a post-process signal G1. Similarly, the signal processing circuit 31 for the B-channel is applied with the device output signal BO, and delivers a post-process signal B1. Further, the signal processing circuit 32 for the R-channel is applied with the device output signal RO, and delivers a post-process signal R1.

The image enhancing part 4 is made up of two 1-horizontal-period delay circuits 40 and 41, a vertical contour signal generating circuit 42, a horizontal contour signal generating circuit 43 and a contour signal adding circuit 44. It is to be noted that the out-of-green method is used in the embodiment of FIG. 1. According to this method, a contour signal is derived only from the G-channel.

The post-process signal G1 of the G-channel is applied to the 1-horizontal-period delay circuit 40, which delivers an output signal G2. The signal G2 is delayed as compared with the signal G1, by one horizontal period. The signal G2 is applied to the 1-horizontal-period delay circuit 41, which delivers an output signal G3. The signal G3 is delayed as compared with the signal G2, by one horizontal period. The signals G1, G2 and G3 of the G-channel are applied to the vertical contour signal generating circuit 42, which delivers a vertical contour signal VE. The output signal G2 of the 1-horizontal-period delay circuit 40 is also applied to the horizontal contour signal generating circuit 43, which delivers a horizontal contour signal HE.

When the vertical contour signal VE is added to the output signal G2 of the 1-horizontal-period delay circuit 40, image enhancement in upper and lower directions can be made. Therefore, in the contour signal adding circuit 44, the vertical contour signal VE and the horizontal contour signal HE are added to that signal G2 of the G-channel which is delayed by one horizontal period, to obtain a signal GOUT which has been subjected to image enhancement. In each of the R- and B-channels, also, a delayed signal corresponding to the signal G2 is required to obtain a signal which has been subjected to image enhancement. However, when the solid-state image sensors 11 to 13 are driven by the vertical drive signals of FIG. 2, the device output signal BO of the B-channel and the device output signal RO of the R-channel are delayed as compared with the device output signal GO of the G-channel, by one horizontal period. Therefore, it is not required to arrange a 1-horizontal-period delay circuit in each of the B- and R-channels, but the outputs B1 and R1 of the signal processing circuits 31 and 32 can be applied directly to the contour signal adding circuit 44. Similarly to the G-channel, the image enhancement for the B- and R-channels is carried out in the contour signal adding circuit 44. That is, in the contour adding circuit 44, the vertical contour signal VE and the horizontal contour signal HE are added to the signals B1 and R1 to obtain signals BOUT and ROUT which have been subjected to image enhancement.

As mentioned above, in the embodiment of FIG. 1, the outputs RO and BO of the solid-state image sensors 11 and 13 are delayed as compared with the output GO of the solid-state image sensor 12. Thus, in the image enhancing part, it is not required to arrange a 1-horizontal-period delay circuit in each of the B- and R-channels. As a result, the power consumption and circuit scale of the image enhancing part can be reduced.

Figure 3:
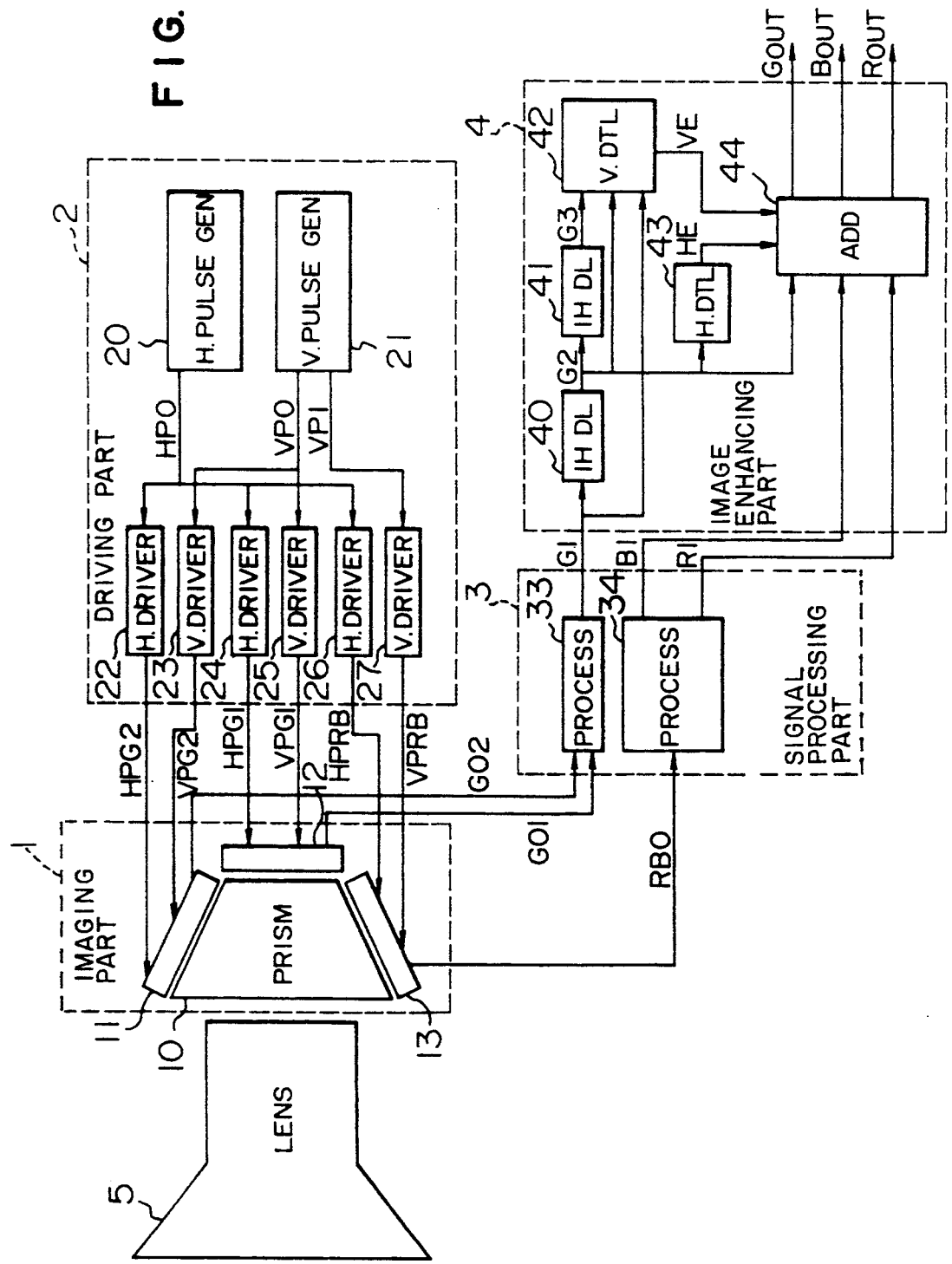
FIG. 3 is a block diagram showing the second embodiment of a video camera according to the present invention.

In the above, the first embodiment of the present invention has been explained which is a video camera for the RGB imaging method. FIG. 3 is a block diagram showing the second embodiment of a video camera according to the present invention which embodiment is a video camera for the dual-green method. In a video camera of this type, a signal for the G-channel is obtained from two of three solid-state image sensors, and signals for the R- and B-channels are derived from the remaining solid-state image sensor. In this case, the image sensors for the G-channel are disposed so as to be deviated from each other in the horizontal direction by half a pixel pitch. Thus, the bandwidth of the G-channel mainly contributing to a luminance signal is enlarged.

Referring to FIG. 3, the present embodiment is similar in configuration of the imaging part to the first embodiment of FIG. 1, but is different in operation of the prism 10 from the first embodiment. In the prism 10 of FIG. 3, incident light is separated into the G-component and the remaining color components, and the G-component is divided into halves, which form optical images on the solid-state image sensors 11 and 12. The remaining color components, that is, the R- and B-components form an image on the solid-state image sensor 13. In this case, however, a stripe filter of red and blue is disposed on the solid-state image sensor 13, to separate the above image into red and blue images. In the present embodiment, the device outputs of the solid-state image sensors 11 and 12 will be referred to as GO2 and GO1, respectively, and the device output of the image sensor 13 will be referred to as RBO.

The driving part 2 of the present embodiment is similar to the driving part of the first embodiment, but is different therefrom in that the vertical drivers 23 and 25 amplify the vertical drive signal VP0, and only the vertical driver 27 amplifies the vertical drive signal VP1. Now, let us express the outputs of the vertical drivers 23, 25 and 27 by vertical drive pulse signals VPG2, VPG1 and VPRB, respectively, and express the outputs of the horizontal drivers 22, 24 and 26 by horizontal drive pulse signals HPG2, HPG1 and HPRB, respectively. At this time, the vertical drive pulse signal VPRB is smaller in the number of vertical transfer pulses than the remaining vertical drive-pulse signals by one. Thus, the device output RBO for an R/B channel is delayed as compared with the device outputs GO1 and GO2, by one horizontal period.

Since the present embodiment is a video camera in the dual-green method, the signal processing part 3 of the present embodiment is different from that of the first embodiment. That is, the signal processing part 3 is made up of two signal processing circuits 33 and 34. The signal processing circuit 33 is applied with two device signals GO1 and GO2 for the G-channel, combines these signals, and delivers a post-process signal G1 for the G-channel. The signal processing circuit 34 is applied with the device output signal RBO for R/B channel, separates the signal RBO into a red component signal and a blue component signal, and delivers a post-process signal R1, B1 for the R-channel, and the B-channel respectively. Since the present embodiment includes the same image enhance part with the first embodiment, explanation of the image enhance part will be omitted.

As mentioned above, in the video camera of the dual-green type shown in FIG. 3, also, the post-process signals for the R- and B-channels are delayed as compared with the post-process signal for the G-channel. Thus, like the first embodiment, the second embodiment can reduce the power consumption of an image enhancer circuit, and can make small the circuit scale thereof.

Figure 4:
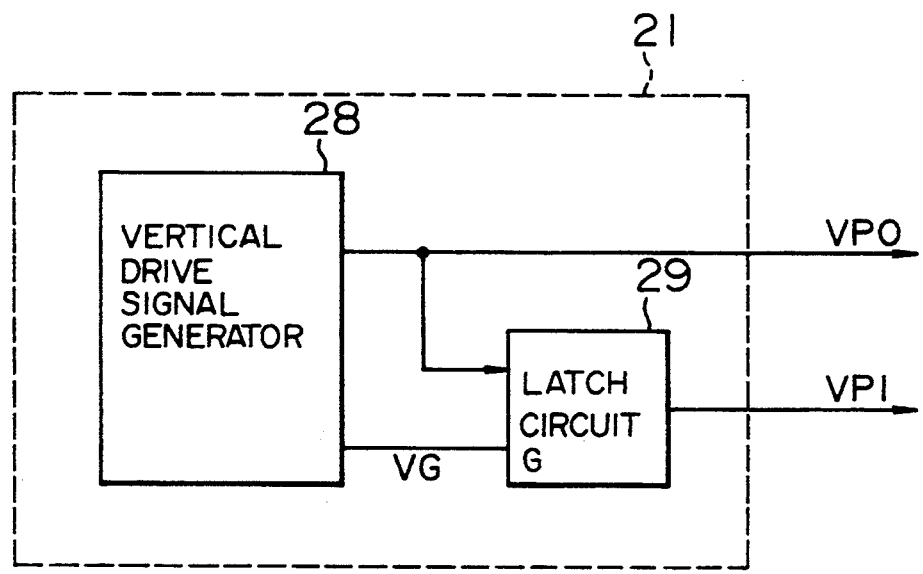
FIG. 4 is a block diagram showing a main part of the third embodiment of a video camera according to the present invention.

Next, explanation will be made of the third embodiment of a video camera according to the present invention. In the present embodiment, a circuit shown in FIG. 4, that is, a circuit made up of a vertical drive signal generator 28 and a latch circuit 29 is used as the vertical drive signal generating circuit 21 of the first embodiment. The latch circuit 29 operates as follows. When a control signal input terminal G is put to a high level, the input signal of the latch circuit 29 is delivered therefrom, as it is. When the control signal input terminal G is put to a low level, the output of the latch circuit 29 is kept unchanged.

In the present embodiment, the vertical drive signal generator 28 delivers one kind of vertical drive signal VP0 and a gate signal VG. The latch circuit 29 latches the vertical drive signal VP0 on the basis of the gate signal VG, to produce another vertical drive signal VP1.

Figure 5:
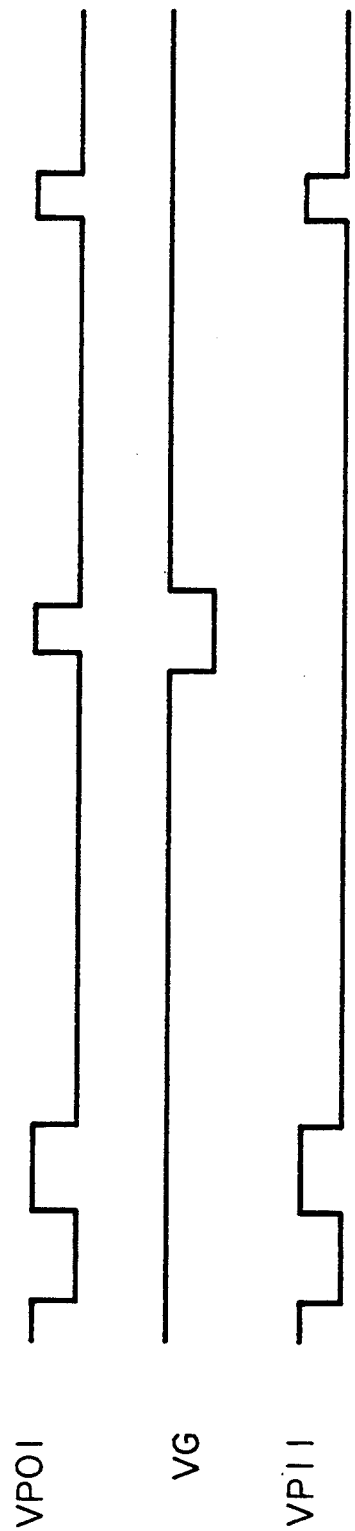
FIG. 5 is a timing chart showing a main portion of each of vertical drive signals used in the third embodiment of FIG. 4.

FIG. 5 shows examples of signal waveforms used in the third embodiment. That is, FIG. 5 shows the signals VP01 and VP11 of FIG. 2 and the gate signal VG. It is to be noted that a period from the end of a vertical blanking period to an initial part of an scanning period is enlarged in FIG. 5. As shown in FIG. 5, the vertical drive signal VP01 is latched on the basis of the gate signal VG, to produce the other vertical drive signal VP11. Other vertical drive signals VP12, VP13 and VP14 of FIG. 2 can be readily produced in a manner similar to the above-mentioned. That is, the vertical drive signal generating circuit 21 of FIG. 4 can produce the same effect as that of the first embodiment by generating only one kind of vertical drive signal VP0 and one gate signal VG, and moreover can be made small in circuit scale.

In the present embodiment, the latch circuit is used for forming the vertical drive signal generating circuit 21. The gist of the present invention, however, resides in that two kinds of vertical drive signals are used, and one and the other of the vertical drive signals are applied to one of the solid-state image sensors and the remaining solid-state image sensors, respectively. Therefore, the circuit configuration of the vertical drive signal generating circuit 21 is not limited to the circuit configuration of FIG. 4.

Next explanation will be made of the fourth embodiment of a video camera according to the present invention. In the present embodiment, the second vertical drive signal VP1 is changed from one of two states over to the other state. In the third embodiment, by using the gate signal VG of FIG. 5, the second vertical drive signal VP1 is made smaller in the number of vertical transfer pulses than the first vertical drive signal VP0 by one. However, when the gate signal VG is always kept at the high level, the output VP1 of the latch circuit 22 will be identical to the input VP0 thereof. That is, when the gate signal VG is changed from one of the state of FIG. 5 and the high level keeping state over to the other state, the second-vertical drive signal VP1 is changed from one of two kinds of signals over to the other signal. Thus, the presence or absence of a time lag between the outputs of solid-state image sensors can be controlled. That is, unlike a case where the optical positional relation between solid-state image sensors is changed, the time lag between the outputs of solid-state image sensors can be readily controlled by changing the gate signal.

The third embodiment uses the image enhance circuit of FIG. 1, that is, an image enhance circuit having two 1-horizontal-period delay circuits. When the time lag between the outputs of image sensors is eliminated by changing the gate signal, the fourth embodiment is readily applicable to a general, external image enhancer.

We claim:

1. A video camera comprising:
imaging means including a separating means for separating incident light into a plurality of channels and a plurality of solid-state image sensors each for converting a light signal from one of the plurality of channels into an electric signal, each of the solid-state image sensors delivering a device output signal; and driving means including a horizontal drive signal generating circuit for generating a group of horizontal drive signals, a vertical drive signal generating circuit for generating at least first and second groups of vertical drive signals, horizontal driving means for receiving said group of horizontal drive signals to drive the plurality of solid-state image sensors, first vertical driving means for receiving said first group of vertical drive signals to drive a predetermined one of the plurality of solid-state image sensors, and second vertical driving means for receiving said second group of vertical drive signals to drive the plurality of solid-state image sensors except for the predetermined one of the plurality of solid-state image sensors, said first group of vertical drive signals being different in a number of vertical transfer pulses from said second group of vertical drive signals.

2. A video camera according to claim 1, wherein the second group of vertical drive signals are smaller in the number of vertical transfer pulses than the first group of vertical drive signals by one transfer pulse.

3. A video camera according to claim 1, wherein the second group of vertical drive signals are larger in the number of vertical transfer pulses than the first group of vertical drive signals by one transfer pulse.

4. A video camera according to claim 1, wherein the vertical drive signal generating circuit includes a first vertical drive signal generator for generating the first group of vertical drive signals and a control signal, and a decoding circuit for generating the second group of vertical drive signals from the first group of vertical drive signals and the control signal.

5. A video camera according to claim 1, wherein the driving means includes selecting means for selecting and outputting to said second vertical driving means one of said second group of vertical drive signals and a third group of vertical drive signals equal in the number of vertical transfer pulses to the first group of vertical drive signals.

6. A video camera according to claim 1, wherein the separating means comprises a prism.

7. A video camera comprising:
imaging means including a separating means for separating incident light into a plurality of channels and a plurality of solid-state image sensors each for converting a light signal from one of the plurality of channels into an electric signal, each of the solid-state image sensors delivering a device output signal;

driving means including a horizontal drive signal generating circuit for generating a group of horizontal drive signals, a vertical drive signal generating circuit for generating at least first and second groups of vertical drive signals, horizontal driving means for receiving said group of horizontal drive signals to drive the plurality of solid-state image sensors, first vertical driving means for receiving said first group of vertical drive signals to drive a predetermined one of the plurality of solid-state image sensors, and second vertical driving means for receiving said second group of vertical drive signals to drive the plurality of solid-state image sensors except for the predetermined one of the plurality of solid-state image sensors, said first group of vertical drive signals being different in a number of vertical transfer pulses from said second group of vertical drive signals;

signal processing means for carrying out image processing for the device output signals of the plurality of solid-state image sensors to deliver a plurality of processed signals; and image enhancing means including a plurality of image enhancing circuits, each of the plurality of image enhancing circuits being applied with one of the plurality of processed signals to carry out image enhancement for the one of the plurality of processed signals to deliver a enhanced signal.

8. A video camera according to claim 7, wherein the second group of vertical drive signals are smaller in the number of vertical transfer pulses than the first group of vertical drive signals by one transfer pulse.

9. A video camera according to claim 7, wherein the second group of vertical drive signals are larger in the number of vertical transfer pulses than the first group of vertical drive signals by one transfer pulse.

10. A video camera according to claim 7, wherein the vertical drive signal generating circuit includes a first vertical drive signal generator for generating the first group of vertical drive signals and a control signal, and a decoding circuit for generating the second group of vertical drive signals from the first group of vertical drive signals and the control signal.

11. A video camera according to claim 7, wherein the driving means includes selecting means for selecting and outputting to said second vertical driving means one of said second group of vertical drive signals and a third group of vertical drive signals equal in the number of vertical transfer pulses to the first group of vertical drive signals.

12. A video camera according to claim 7, wherein, in the image enhancing means, only a first one-of the plurality of image enhancing circuits includes a 1-horizontal-period delay circuit.

13. A video camera according to claim 7, wherein, in the image enhancing means, only first and second ones of the plurality of image enhancing circuits include a 1-horizontal-period delay circuit.

14. A video camera according to claim 7, wherein the separating means comprises a prism.

* * * * *